United States Patent
Melvin, Jr. et al.

(10) Patent No.: US 8,880,765 B2
(45) Date of Patent: Nov. 4, 2014

(54) INTERFACE BUS FOR UTILITY-GRADE NETWORK COMMUNICATION DEVICES

(75) Inventors: Charles W. Melvin, Jr., Dudley, GA (US); Robert Bryan Seal, Meridian, MS (US); Phillip Warren, Macon, GA (US); Edward Glenn Howard, Crystal Springs, MS (US)

(73) Assignee: Itron, Inc., Liberty Lake, WA (US)

( * ) Notice: Subject to any disclaimer, the term of this patent is extended or adjusted under 35 U.S.C. 154(b) by 1042 days.

(21) Appl. No.: 12/899,498

(22) Filed: Oct. 6, 2010

(65) Prior Publication Data

US 2012/0054397 A1 Mar. 1, 2012

Related U.S. Application Data

(60) Provisional application No. 61/377,025, filed on Aug. 25, 2010.

(51) Int. Cl.
*G06F 13/14* (2006.01)

(52) U.S. Cl.
USPC ........ 710/301; 710/104; 702/62; 340/870.03; 340/870.11

(58) Field of Classification Search
USPC ........... 710/301–302; 713/324, 300–320, 340
See application file for complete search history.

(56) References Cited

U.S. PATENT DOCUMENTS

| | | | |
|---|---|---|---|
| 4,374,316 A | 2/1983 | Inamori et al. | |
| 4,454,552 A | 6/1984 | Barnes et al. | |
| 5,077,675 A | 12/1991 | Tam | |
| 5,638,289 A | 6/1997 | Yamada et al. | |
| 5,645,123 A | 7/1997 | Doi et al. | |
| 5,854,904 A | 12/1998 | Brown | |
| 5,880,677 A | 3/1999 | Lestician | |
| 5,896,259 A | 4/1999 | Farwell et al. | |
| 6,114,674 A | 9/2000 | Baugh et al. | |
| 6,127,660 A | 10/2000 | Scafati | |
| 6,209,631 B1 | 4/2001 | Garcia-Ortiz | |
| 6,232,676 B1 | 5/2001 | Kozyra et al. | |
| 6,621,055 B2 | 9/2003 | Weber et al. | |
| 6,665,620 B1 * | 12/2003 | Burns et al. | 702/62 |
| 6,781,056 B1 | 8/2004 | O'Rourke et al. | |
| 6,816,936 B1 | 11/2004 | Wu et al. | |

(Continued)

FOREIGN PATENT DOCUMENTS

| | | |
|---|---|---|
| KR | 20020066616 | 8/2002 |
| WO | 2006083958 | 8/2006 |

OTHER PUBLICATIONS

Cisco, "Online Insertion Removal and Hot-Swapping," http://www.cisco.com/en/US/docs/routers/access/2900/hardware/installation/guide/appendix.pdf, retrieved Nov. 8, 2011, 2 pages.

(Continued)

*Primary Examiner* — Ryan Stiglic
(74) *Attorney, Agent, or Firm* — Hanley, Flight & Zimmerman, LLC

(57) ABSTRACT

In one embodiment, a network device having a plurality of hardware interfaces is disclosed. The network device includes a central processing unit and a main circuit board. The main circuit board has expansion slots that receivably connect corresponding secondary circuit boards to the main circuit board. The main circuit board also has sensors for detecting predetermined parameters. A voltage regulator is operative to regulate one or more particular expansion slots, in response to detection of a predetermined parameter associated with respective slots.

30 Claims, 8 Drawing Sheets

(56) References Cited

U.S. PATENT DOCUMENTS

| | | | |
|---|---|---|---|
| 6,900,411 B2 | 5/2005 | Norton et al. | |
| 6,928,560 B1 | 8/2005 | Fell, III et al. | |
| 7,016,202 B2 | 3/2006 | Shih | |
| 7,026,932 B2 | 4/2006 | Loudon | |
| 7,134,029 B2* | 11/2006 | Hepner et al. | 713/300 |
| 7,200,317 B2 | 4/2007 | Reagan et al. | |
| 7,295,442 B2 | 11/2007 | Garnett et al. | |
| 7,312,721 B2* | 12/2007 | Mason et al. | 340/870.02 |
| 7,335,855 B2 | 2/2008 | von der Lühe et al. | |
| 7,432,823 B2 | 10/2008 | Soni | |
| 7,437,579 B2 | 10/2008 | Jeddeloh et al. | |
| 7,457,503 B2 | 11/2008 | Solheid et al. | |
| 7,522,876 B1 | 4/2009 | Meitzen et al. | |
| 7,589,630 B2 | 9/2009 | Drake et al. | |
| 7,680,622 B2 | 3/2010 | Dupuy et al. | |
| 7,747,733 B2* | 6/2010 | Kagan | 709/224 |
| 8,060,259 B2* | 11/2011 | Budhraja et al. | 700/291 |
| 8,421,614 B2* | 4/2013 | Cagno et al. | 340/538 |
| 8,441,780 B2 | 5/2013 | Seal et al. | |
| 8,445,818 B2 | 5/2013 | Marcus et al. | |
| 8,581,169 B2* | 11/2013 | Banhegyesi | 250/208.4 |
| 8,587,429 B2 | 11/2013 | Melvin, Jr. et al. | |
| 8,704,630 B2 | 4/2014 | Melvin, Jr. et al. | |
| 2001/0012299 A1* | 8/2001 | Dahlen | 370/429 |
| 2003/0151500 A1* | 8/2003 | Mitsui | 340/426.1 |
| 2005/0039040 A1 | 2/2005 | Ransom et al. | |
| 2005/0129379 A1 | 6/2005 | Reagan et al. | |
| 2005/0280528 A1* | 12/2005 | Olsen et al. | 340/531 |
| 2006/0112211 A1* | 5/2006 | Sandy et al. | 710/315 |
| 2006/0155517 A1 | 7/2006 | Dobbs et al. | |
| 2007/0067119 A1* | 3/2007 | Loewen et al. | 702/57 |
| 2007/0138275 A1 | 6/2007 | Hall | |
| 2008/0005611 A1* | 1/2008 | Solyanik | 714/6 |
| 2008/0134349 A1 | 6/2008 | Fleischman et al. | |
| 2008/0174424 A1 | 7/2008 | Drake et al. | |
| 2009/0324187 A1 | 12/2009 | Wakileh et al. | |
| 2010/0049822 A1 | 2/2010 | Davies et al. | |
| 2010/0100250 A1* | 4/2010 | Budhraja et al. | 700/291 |
| 2010/0112955 A1* | 5/2010 | Krishnaswamy et al. | 455/67.11 |
| 2010/0217550 A1* | 8/2010 | Crabtree et al. | 702/62 |
| 2010/0280774 A1* | 11/2010 | Ewing et al. | 702/60 |
| 2010/0332373 A1* | 12/2010 | Crabtree et al. | 705/37 |
| 2011/0193701 A1 | 8/2011 | Hanft | |
| 2012/0050000 A1 | 3/2012 | Melvin, Jr. et al. | |
| 2012/0050040 A1 | 3/2012 | Melvin, Jr. et al. | |
| 2012/0050971 A1 | 3/2012 | Seal et al. | |

OTHER PUBLICATIONS

The United States Patent and Trademark Office, "Non-Final Office Action," issued in connection with U.S. Appl. No. 12/899,480, dated Jan. 3, 2013, 9 pages.

The United States Patent and Trademark Office, "Final Office Action," issued in connection with U.S. Appl. No. 12/899,480, dated Apr. 26, 2013, 6 pages.

The United States Patent and Trademark Office, "Notice of Allowance," issued in connection with U.S. Appl. No. 12/899,480, dated Jul. 17, 2013, 9 pages.

The United States Patent and Trademark Office, "Notice of Allowance," issued in connection with U.S. Appl. No. 12/899,460, dated Mar. 4, 2013, 8 pages.

The United States Patent and Trademark Office, "Non-Final Office Action," issued in connection with U.S. Appl. No. 12/899,472, dated Jul. 25, 2013, 15 pages.

The United States Patent and Trademark Office, "Notice of Allowance," issued in connection with U.S. Appl. No. 12/899,472, dated Nov. 29, 2013, 15 pages.

* cited by examiner

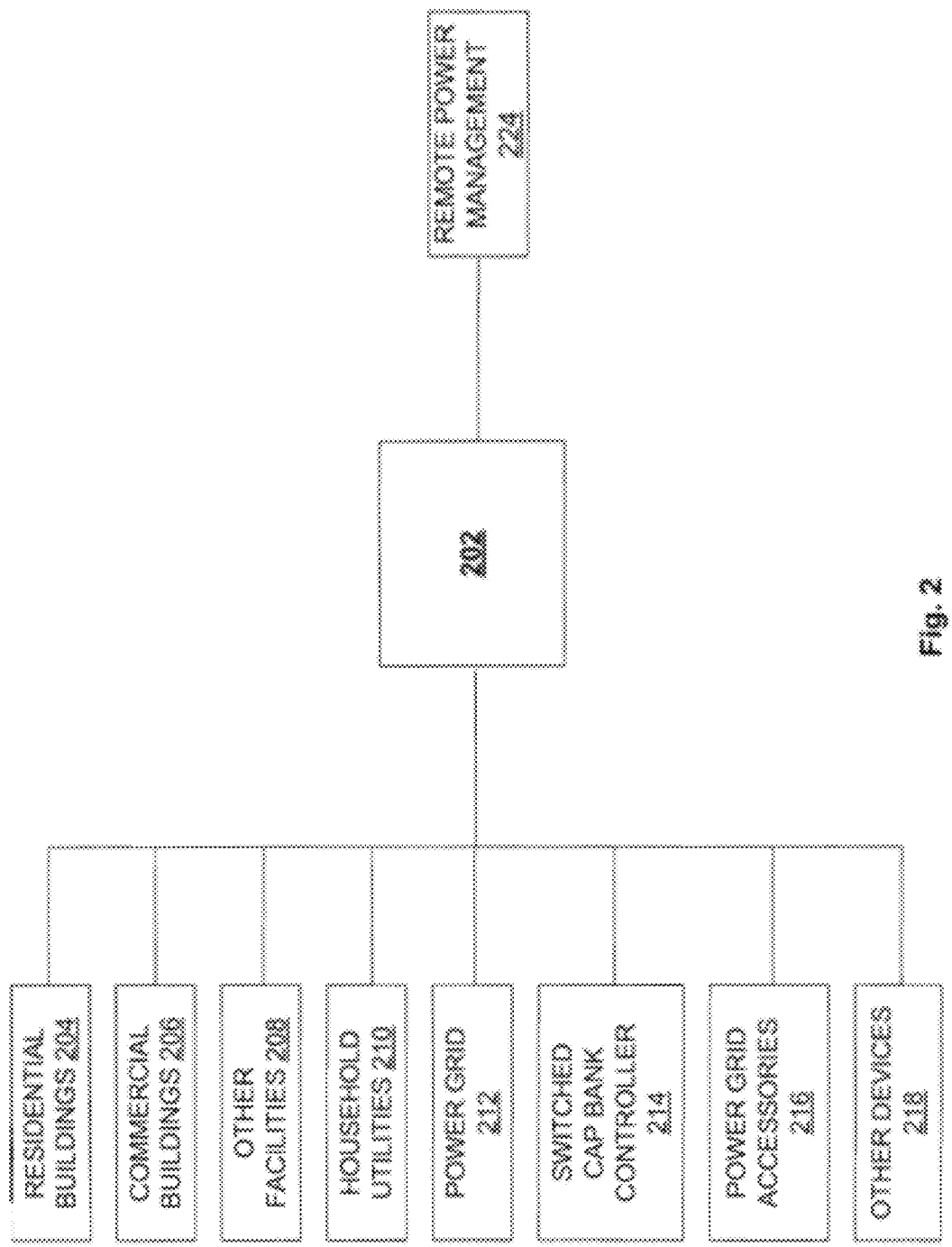

INTERFACE BUS FOR UTILITY-GRADE NETWORK COMMUNICATION DEVICES

CROSS REFERENCE TO RELATED PATENT APPLICATION

This application claims the benefit, pursuant to 35 U.S.C. §119(e) of U.S. provisional Application Ser. No. 61/377,025, filed Aug. 25, 2010, entitled "Interface Bus for Utility-Grade Network Communication Devices" by Charles W. Melvin, Robert B. Seal, Phillip Warren, and Edward G. Howard, the disclosure for which is hereby incorporated by reference in its entirety.

FIELD OF THE INVENTION

The present application relates generally to network routers, and more specifically to an intelligent communications device for a smart grid, hereinafter also referred to as an "apparatus" or "network apparatus", for managing interconnection of various electrical devices and facilities.

In one aspect, the present invention relates to monitoring and control of field replaceable units, and in particular monitoring and controlling operability of secondary circuit boards mounted that are operatively connected to the main circuit board.

BACKGROUND OF THE INVENTION

Various electronic devices, communication devices and modules can be mounted on a motherboard or a printed circuit board. In recent years, it has been observed that a number of electronic devices and modules configured on the main circuit board are required to be replaced to repair or upgrade the functionality of an existing apparatus. When it is not possible to replace the individual electronic devices mounted on the main circuit board, the whole apparatus may need to be changed. Also, it may not be feasible to monitor and control the operability of the electronic devices and modules connected to the main circuit board when extreme environmental conditions exist. Conventional methods of configuring electronic devices of a main circuit board do not provide for an option to anticipate, detect and respond to system problems by using standard hardware interfaces.

Among other needs, there exists a need for an apparatus, system, and method for facilitating, replacing, and upgrading electronic devices connected to and configured on a main circuit board, in the field. There also exists a need for the electronic devices to be controlled and monitored to ensure that system performance remains at its intended level of operation, even in extreme environmental conditions.

SUMMARY OF THE INVENTION

In one aspect, the present invention relates to a system and method for controlling operation of a plurality of electronic devices in a smart grid. In one or more exemplary embodiments, an intelligent communications device is operatively connected with other devices and/or systems and one or more electrical distribution networks. One or more of these electronic devices may work in collaboration with the intelligent communications device in a smart grid network infrastructure. In one or more embodiments, the electronic devices may be arranged in various configurations to operate in networks such as LAN, WAN, and/or HAN networks.

In one embodiment, the intelligent communications device is configured with other devices and/or monitoring equipment for monitoring and management of electrical energy consumption. The intelligent communications device operates on wireless communications networks and according to one or more wireless protocols such as commercial cellular, Bluetooth, and/or 802.11.

In one embodiment, the intelligent communication device is field upgradable, and is configured such that additional hardware can be installed for enabling new protocols or technologies to be developed. The intelligent communications device is operative to implement open source software configured to facilitate integration of different types of devices with additional circuitry and/or hardware. Further, the intelligent communications device is operable to update the open source software periodically or at a pre-defined time.

In one embodiment, the intelligent communications device has a programmable processor that is operative to cause a device to receive relevant device monitoring data on secondary circuit boards and on field replaceable units (FRUs) that are connected to a main circuit board, from sensors, using standard hardware interfaces. The programmable processor is operative to control, monitor and respond to various functional needs of the overall system. A management information database (MIB) keeps a log of internal events. SNMP tools can access the MIB where predetermined parameters are available, and the programmable processor can cause the system to respond to changes in operability conditions, according to predetermined parameters. The programmable processor is further operable to cause the selective enabling or disabling of secondary circuit boards on the main circuit board through a hardware interface bus, in response to any detected changes in predetermined parameters.

In another aspect, the present invention relates to a network device having a plurality of interfaces. The network device includes a programmable central processing unit and a main circuit board with a plurality of expansion slots that are operative to receivably connect to secondary circuit boards. The device also has voltage regulators and sensors, where the sensors are operative to detect a predetermined parameter and the voltage regulators are operative to regulate the operation of a particular expansion slot in response to a detected parameter associated with the particular expansion slot.

In yet another aspect, the present invention relates to a remotely operable system. In one embodiment, the system includes a central processing unit and a circuit board with multiple interfaces. There are sensors associated with the multiple interfaces, for sensing predetermined parameters. The central processing unit operatively regulates the interfaces according to sensed predetermined parameters.

In yet another aspect, the present invention relates to a computer-implemented method for remotely operating a network device. In one embodiment, the method includes the step of configuring interfaces on a circuit board, where the interfaces have an associated voltage regulator and temperature sensor. The voltage regulator is operative to regulate the interfaces according to one or more predetermined parameters.

BRIEF DESCRIPTION OF THE DRAWINGS

FIG. 2 depicts various facilities, devices and equipment interfaced with an intelligent communications device according with one embodiment of the present invention.

DETAILED DESCRIPTION OF THE INVENTION

Description of the various embodiments detailed below is for understanding the invention. It will be understood that the invention is not limited to the particular embodiments described herein, but is capable of various modifications, rearrangements and substitutions, which will now become apparent to those skilled in the art without departing from the scope of the invention. Therefore, it is intended that the following claims cover all such modifications and changes that fall within the spirit and scope of the invention.

In alternative embodiments, system, process, and apparatus may include additional, fewer, or different components. In addition, the each component may include additional modules, software, and interface devices that may be appended on requirement to operate the present invention in alternate embodiments.

Figure 1:
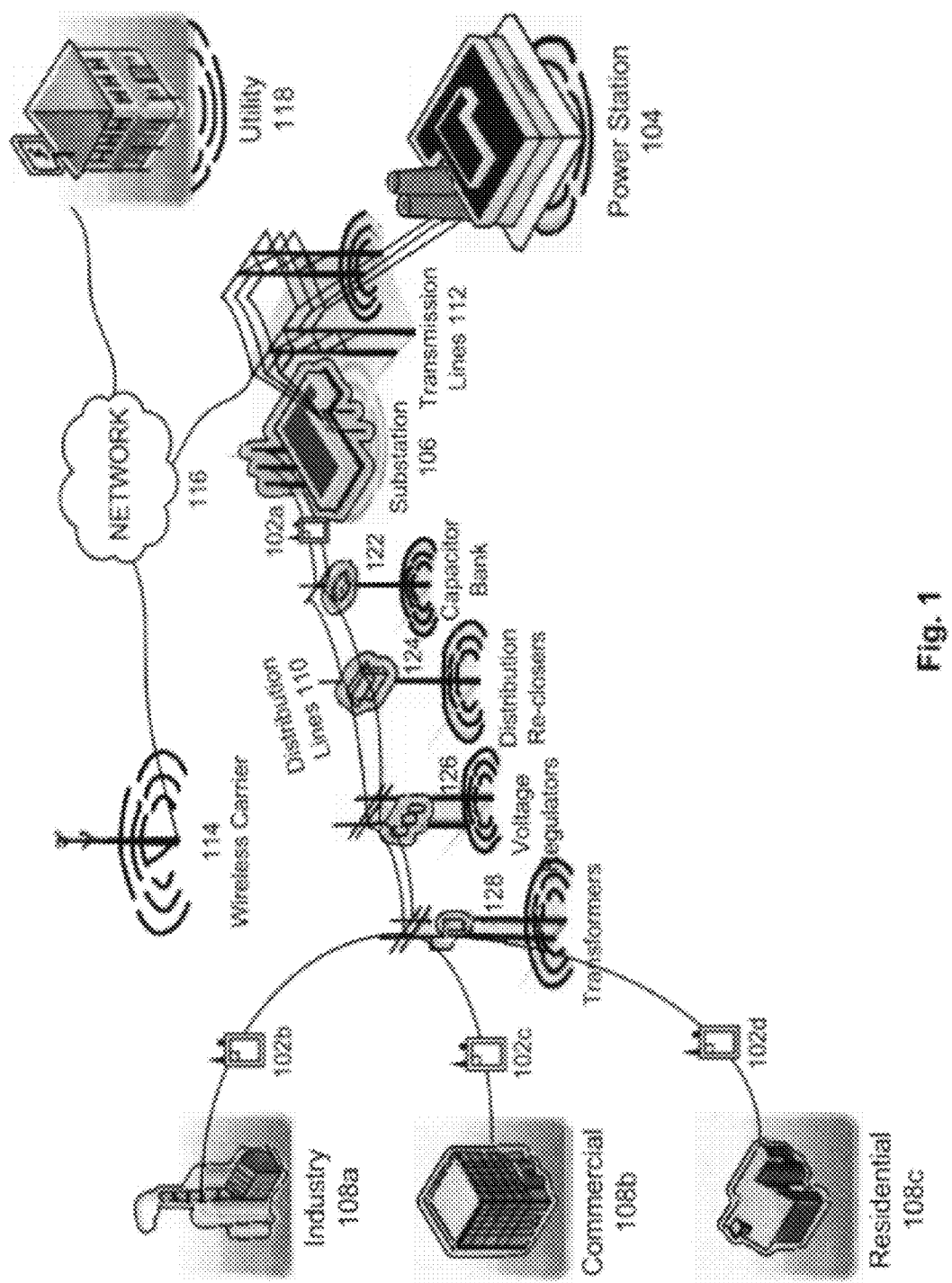
FIG. 1 is a schematic illustration of an overall environment in which one or more aspects of the present invention can be practiced.

Referring to FIG. 1, an intelligent communications device for a smart grid communicatively coupled to a plurality of devices and/or facilities for management of energy requirements is depicted. Integration of the intelligent communications device 102 into the smart grid infrastructure may be performed using minimal capital expenditure.

FIG. 1 illustrates an environment in which the present invention may be practiced. The environment may include a plurality of electrical generation facilities such as thermal power plants, hydro-based power plants (dams, for example), solar powered electricity generation units, and wind powered electricity generation units. Various electricity-generating plants are collectively referred to as power generation units 104. The electricity generated from the power generation units 104 may be distributed through a plurality of high voltage transmission lines 112 to a substation 106. For example, high voltage electricity may be distributed via plurality of towers and a plurality of medium voltage distribution cables 110.

By way of example and not a limitation in one implementation, the substation 106 may receive power from the plurality of high voltage transmission lines 112 from at least one of the plurality of substations such as power station 104. Further, the substation 106 may be associated with an intelligent communications device 102. The intelligent communications device 102 may monitor various parameters such as quality of electricity and electrical load.

The substation 106 may then distribute low voltage electricity to residential entities 108c, industrial entities 108a, and/or commercial entities 108b. The medium voltage distribution lines 110 may include attachments of various devices for improvement of quality electricity. As such, the plurality of distribution lines 110 may run moderate distances and are affected by cable resistance, electrical grid loading, and other factors which constantly effect the operation and efficiency of the electric grid. In order to compensate for a variety of operating conditions, the plurality of distribution lines 110 may include connections to capacitor banks 122, distribution re-closers 124, voltage regulators 126, transformers 128 and other types of equipment.

The electricity may be supplied to the one or more industrial entities such as industry 108a, via intelligent communications device 102b. Likewise, the plurality of distribution lines 110 may feed electricity to one or more commercial entities such as commercial entity 108b, one or more residential entities 108c, through intelligent communications devices 102c and 102d. Hereinafter, intelligent communications devices 102a, 102b, 102c, and 102d may be collectively referred to as "intelligent communications device 102."

The intelligent communications device 102 may be configured to operate with a central control station, regulatory authority, audit compliance authority, and/or electrical monitoring systems. Apart from monitoring the various parameters such as electrical quality, the intelligent communications device 102 may be coupled wirelessly to a plurality of wireless carriers such as 114. Alternatively, the intelligent communications device 102 may be coupled with communications network 116 using powerline communication. Further, the wireless carrier 114 may receive signals that may be utilized for moderating the distribution of electricity from the substation 106 to industrial entity 108a, commercial entity 108b, and/or residential entity 108c.

The intelligent communications device 102 may be connected with a plurality of utilities in a building, a commercial complex, and/or an industry. By way of example and not a limitation, in one implementation, intelligent communications device 102 may be connected to utility 118. In an embodiment, the utility 118 may include lighting systems, refrigerators, air conditioners, computers, televisions, home theaters, electric irons, water filters, air filters, air compressors, and/or vacuum cleaners. The intelligent communications device 102 may directly control the utility 118. In another embodiment, one or more intelligent communications devices 102 may indirectly control the utility 118. In yet another embodiment, the utility 118 may be partially controlled by one or more intelligent communications devices 102 for modulating the electrical consumption. It may be noted that only one implementation is provided; however, those skilled in the art would appreciate that various other implementations are possible without deviating from the scope and spirit of the invention.

The utility may be grouped into essential and non-essential electrical equipment for purposes of control. In this embodiment, the intelligent communications device 102 may be programmed to monitor the one or more utilities 118 on a rule based program.

In an embodiment of the present invention, the intelligent communications device 102 may be coupled to multiple consumers such as industrial entities 108a, commercial entities 108b, and residential entities 108c. The consumer 108a, 108b, and 108c may be hereinafter collectively referred to as 'consumers 108'. The intelligent communications device 102 may facilitate management of electricity to one or more consumers 108. Additionally, the intelligent communications device 102 may also be integrated to communications backhaul providers that may work in synchronization for accumulating data related to electrical consumption, load distribution, quality of electricity, power factor, and/or failure of equipment associated with the distribution of electricity. The information may be communicated to control and monitoring station, either through the network 116 or through wireless carriers 114.

In an embodiment of the present invention, the consumers 108 may be distributed in a geographically area and may be connected to each other through a smart grid. In addition, each consumer 108a may have one or more smart appliances. The smart appliances may be managed by the intelligent communications device 102 for optimizing electricity consumption.

Referring to FIG. 2, an arrangement of configuring various electrical facilities with an intelligent communications device 202 is shown, according to one embodiment of the present invention. The intelligent communications device 202 may communicate with the plurality of devices and/or facilities, such as but not limited to, residential buildings 204, commercial entities 206, other facilities 208, household utilities 210, power grids 212, switched cap bank controllers 214, grid accessories 216, other devices 218, and remote power management utilities 224. Other facilities 208 may include but not limited to schools, small offices, sports complexes, shops, malls, federal offices, utility complexes, or other types of buildings having electrical connection and consuming electricity. The intelligent communications device 202 may facilitate energy management for one or more of the devices and/or facilities as shown.

Power Management

In an embodiment of the present invention, the intelligent communications device 102 may enable distribution companies to reduce the overall power requirement through better management. This in turn may help in reducing the need for power generation thereby reducing environmental damage. Further, the intelligent communications device 102 may act as a communications hub for monitoring electrical usage, power consumption, quality of electricity, and/or analysis of electrical load, where examples of load type may include inductive load and/or capacitive load. The communications hub may interface various devices in order to monitor electricity consumption and/or power usage.

The intelligent communications device 102 may enable integration of various utilities with the grid for optimizing the overall performance of the system. For example, the load requirement of a particular building may be assessed/monitored using the intelligent communications device 102. The data collected by the intelligent communications device 102 from the various utilities may be utilized for improving the overall electrical consumption of these utilities thereby saving cost and electricity. Alternatively, the intelligent communications device 102 may monitor the performance of different electrical utilities and may facilitate their management in an optimized way.

In another embodiment, the intelligent communications device 102 may be utilized by distribution companies for monitoring the quality of electricity and load characteristics for a specific area. The data recorded by the intelligent communications device 102 may be utilized for increasing the operational efficiency of the power grid.

In another embodiment, the intelligent communications device 102 may facilitate management of demand response for a grid. Currently, power generation and/or power distribution companies face pressure to reduce load either electronically or manually. In such settings, transmission grid operators use demand response to request load reduction in order to manage demand. One or more aspects of the present invention according to this exemplary embodiment allow for transmission grid operators to utilize the intelligent communications device 102 for electronically managing the demand response of electricity.

Integration with Power Grid

In one embodiment, the intelligent communications device 102 may include a communication module for connecting it with a smart grid. In this aspect, the intelligent communications device 102 may increase the performance of the smart grid making it more adaptable and cost effective. In addition, the intelligent communications device 102 may enable utilities to interface with the grid irrespective of the underlying technology, network, or assets. The intelligent communications device 102 may be flexible to accommodate any configuration changes and/or bandwidth changes without affecting the underlying architecture/technology.

In another embodiment of the present invention, the intelligent communications device 102 may communicate with other apparatuses. The communication may be either wireless or through wired connection. Such communication may occur in response to a critical event such as power surge, excess demand, low power factor, when immediate action is required for safeguarding the electrical equipments associated with transmission infrastructure. In another embodiment, the communication between different apparatuses may occur on a continuous basis for optimizing the performance of the system.

Field Upgradability

In another aspect of the present invention, the intelligent communications device 102 may be field-upgradable and may provide field replaceable units for preventing obsolescence. The intelligent communications device 102 may allow utilities to add multiple communication technologies to the smart grid communication infrastructure with change of the underlying technology. By integrating multiple communication technologies, the intelligent communications device 102 may act as a universal hub, to reduce the cost of purchasing additional equipment for implementing multiple network communications protocols. Consumers 108 may integrate multiple appliances and multiple communication technologies using intelligent communications device 102 thereby reducing the total cost of ownership of the equipment. Additionally, consumers 108 may upgrade the intelligent communications device 102 to integrate new communication protocols by just installing additional circuitry without changing existing equipment.

The intelligent communications device 102 may further include a software update module that may connect to the Internet for availability of firmware updates. In response to availability of firmware updates, the software update module may back-up the current firmware before upgrading the intelligent communications device 102 with the new firmware. Failure to implement the new firmware may result in reinstallation of the old firmware from the back up.

In another embodiment of the present invention, the intelligent communications device 102 may include additional slots for inserting PCB boards. These PCB boards may include circuitry for enabling specific protocol, for example, the PCB on PCB board may implement EDGE protocol. Similarly, in another example, a PCB board may implement WiMax protocol. Field service personnel may insert additional PCB boards for upgrading the existing communication protocol without having to replace the intelligent communications device 102. Thus, the intelligent communications device 102 may be upgraded while in operation.

In another embodiment of the present invention, the intelligent communications device for a smart grid may include PCB boards supporting various communication technologies such as but not limited to, WiMax, EDGE, IPv4/IPv6, Bluetooth, Infrared, broadband over powerline, and Ethernet. Software configured in the intelligent communications device 102 may be utilized to enable/disable one or more communication boards. Thus, in one implementation, the apparatus may support Ethernet. In another implementation, the intelligent communications device 102 may support Ethernet and Bluetooth. In these scenarios, the field service personnel may update the intelligent communications device 102 by enabling the boards supporting various communication technologies remotely.

In yet another embodiment of the present invention, the intelligent communications device 102 may include utilities, circuitry for upgrading it on site. Further, the intelligent communications device 102 may include software and/or modules for adding multiple communication technologies to the smart grid communications infrastructure based on future needs without having to replace an entire system backbone. By virtue of having capabilities for adding new devices and facilities, the intelligent communications device 102 may allow consumers to purchase and integrate non-interoperable proprietary technologies from multiple vendors. Vendors may integrate heterogeneous devices using intelligent communications device 102 thereby creating an open environment. In this aspect, the intelligent communications device 102 may allow for consumers to avoid being committed to a specific vendor.

Consumption Monitoring

Consumers of electricity may save money by planning their energy requirements in area implementing Time-Of-Use (TOU) pricing. Consumers may plan the use of electrical appliances in off-peak hours, when the cost of electricity is less, for reducing the total cost of electricity consumption. The intelligent communications device 102 may facilitate the reduction in total consumption of electricity by automatically switching on the electrical appliances in non-peak hours.

Network Protocol Implementation

The intelligent communications device 102 may be based on Internet Protocol (IP) thereby providing seamless integration with different type of networks. For example, the intelligent communications device 102 may facilitate communication with both public and private networks. In embodiments, the network may be either a wired network or a wireless network. Further, networks classified on the basis of scale, such as LAN, WAN, HAN, or functional relationships, such as client server, peer-to-peer, and/or active networks, overlay networks are included within the scope the invention. In an exemplary embodiment, the intelligent communications device 102 communicates using TCP/IP. Likewise, the intelligent communications device 102 may interface with other devices implementing conventional protocols.

The intelligent communications device 102 may facilitate smart grid-enabled appliances to communicate wirelessly with electrical distribution companies to manage their overall consumption of electricity. For example, the intelligent communications device 102 may manage consumption of electricity during peak hours for a distribution network. In this aspect, the intelligent communications device 102 may communicate in real-time with various facilities and other devices to optimize energy efficiency.

In an embodiment of the present invention, the intelligent communications device 102 may include an Ethernet interface for connecting it with external network such as LAN, WAN, or HAN. Further, the Ethernet interface may enable communication with Internet thereby facilitating remote management of utilities. The intelligent communications device 102 may record various parameters such as electricity consumption, power usage and may transfer the recorded data to the remote infrastructure management facility for optimization of the electrical consumption. To this end, the intelligent communications device 102 may enable optimum utilization of the grid infrastructure. The intelligent communications device 102 may be built for outdoor use and may be protected from environmental hazards.

The intelligent communications device 102 may be capable of interfacing with various protocols, networking standards, and other specifications. In an example, the intelligent communications device 102 may facilitate communication by implementing WiMax protocol. In another example, the intelligent communications device 102 may communicate using Bluetooth protocol. In embodiments, the intelligent communications device 102 may communicate using other protocols such as but not limited to token ring, EDGE, UDP, datagram and other proprietary Internet communications protocols. In an example, the intelligent communications device 102 may facilitate communication with ZigBee protocol that allows devices in the home to communicate with a smart meter and neighborhood hub.

In an embodiment of the present invention, the electrical distribution companies may analyze the electrical consumption data collected over a specified period for better management of energy. The intelligent communications device 102 may include a communication link with a database for storing electrical consumption data. In an embodiment, the specified period may be an hour, a day, a month, a year, or any combination of these.

The intelligent communications device 102 may facilitate interoperability among smart grid devices, thereby facilitating seamless deployment of smart devices in a smart grid. In this aspect, various smart devices including smart appliances and smart meters may work in harmony with the intelligent communications device 102. Thus, the intelligent communications device 102 may integrate into the existing smart grid deployment without competing with other existing devices. Alternatively, it may enhance the capability of other smart devices. In an embodiment of the invention, the intelligent communications device 102 may allow integration with other devices without the need for installing additional devices and/or interface circuitry. The smart devices can be configured with the intelligent communications device 102 for management of smart appliances for increasing the operational efficiency of the smart grid. Smart appliances refer to the class of products that enable communication with smart meters and neighborhood hub for saving energy.

The intelligent communications device 102 may enable Internet Protocol based communication involving end-to-end connectivity on a public wireless network. The intelligent communications device 102 may further facilitate two-way delivery of real-time energy usage data over a public wireless network. In an embodiment, the real-time data may include location information along with energy usage information.

In an embodiment of the present invention, the intelligent communications device 102 may include one or more communication ports for connecting to different types of communication devices. The intelligent communications device 102 may include switches, hubs or other interface circuitry for coupling with the external devices. Additionally, the intelligent communications device 102 may include a wireless communication module for connecting with wireless appliances and/or smart devices. In this aspect, the wireless devices such as smart appliances may be enabled by low power protocol such as 6 LOWPAN. Alternatively, the wireless devices may be enabled using Bluetooth, EDGE, IEEE 802.11, and/or infrared.

Open Standards Implementation

The intelligent communications device 102 may implement open standards to leverage existing programs and tools. In this aspect, the intelligent communications device 102 may facilitate rapid application deployment and delivery of the new functionality. For example, the intelligent communications device 102 may update the applications and/or programs in real time. Additionally, updates corresponding to programs and/or applications may be executed at a predefined time in order to update the software, drivers, interface ports, applications. This may ensure that the intelligent communications device 102 may be fully equipped to deny any security attack on it. In another example, interfacing a new smart device with the intelligent communications device 102 may initiate a search for software. Failure to discover appropriate software may result in searching the required software at a remote location such as the Internet. Thus, the intelligent communications device 102 may perform self-healing by automatically scanning and integrating new devices and/or facilities in the smart grid infrastructure.

Enclosure

Figure 3A:
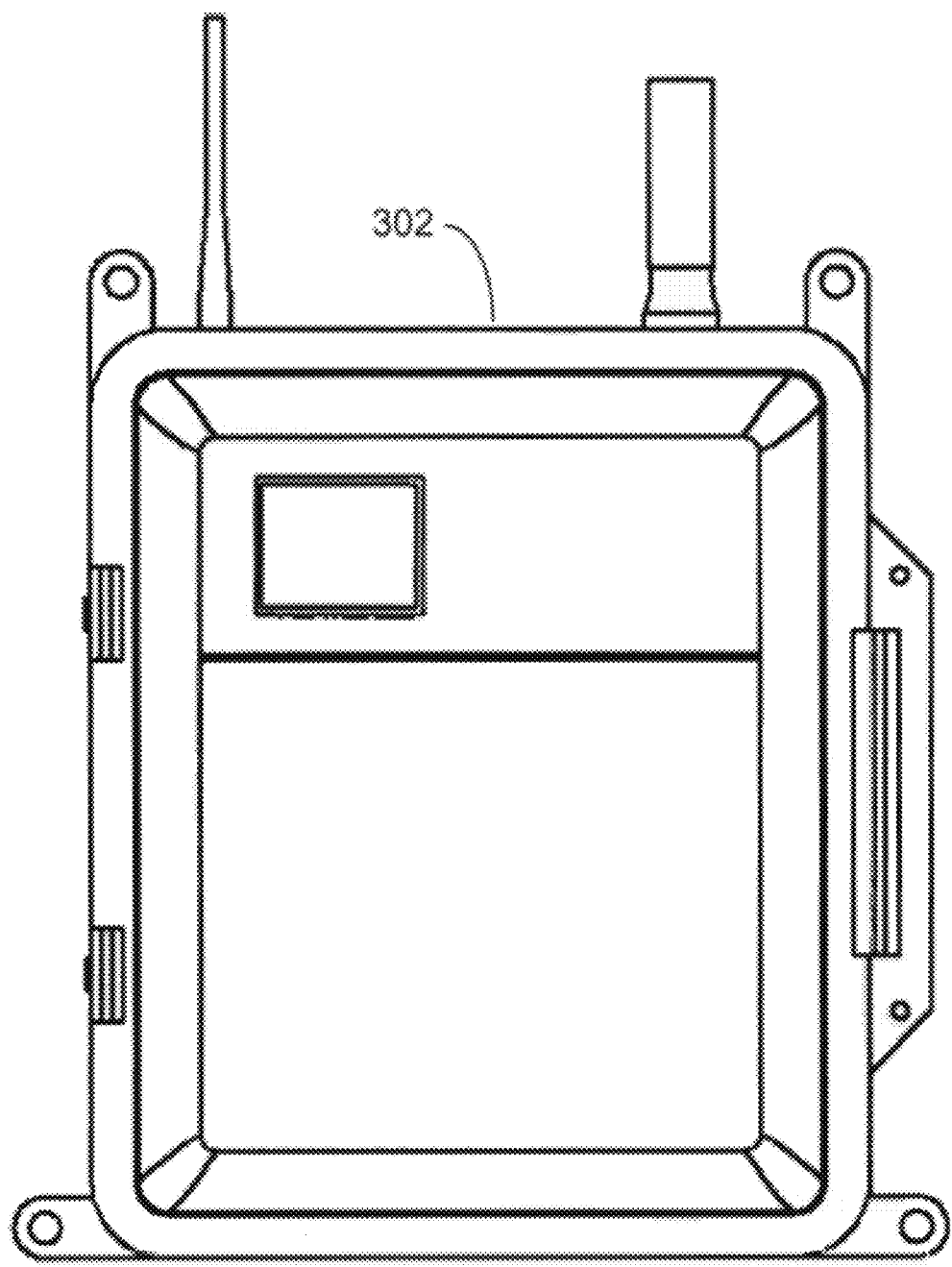
FIG. 3 depicts various modules associated with an intelligent communications device according to one embodiment of the present invention.

Referring to FIG. 3A, an outer enclosure 302 associated with the intelligent communications device 102 is shown, according to one embodiment of the present invention. The intelligent communications device 102 may be enclosed in proper casing 302 for rapid deployment. In this embodiment, the modular and compact design of the intelligent communications device 102 may protect it from damage during installation. The modular design may further enable rapid installation of intelligent communications device 102. For example, the compact modular design may facilitate installation of the intelligent communications device 102 within a small space.

In embodiments, the enclosure may be fabricated from metal, plastic, and other materials, which may be combined.

The compact modular design of the enclosure may be modified for installation in hazardous areas such as refineries, gas plants, and CNG stations. Special enclosures may be provided for installing the intelligent communications device 102 in hazardous areas. In an embodiment of the present invention, the casings and/or enclosures may facilitate a long operational lifetime of the intelligent communications device 102.

Figure 3B:
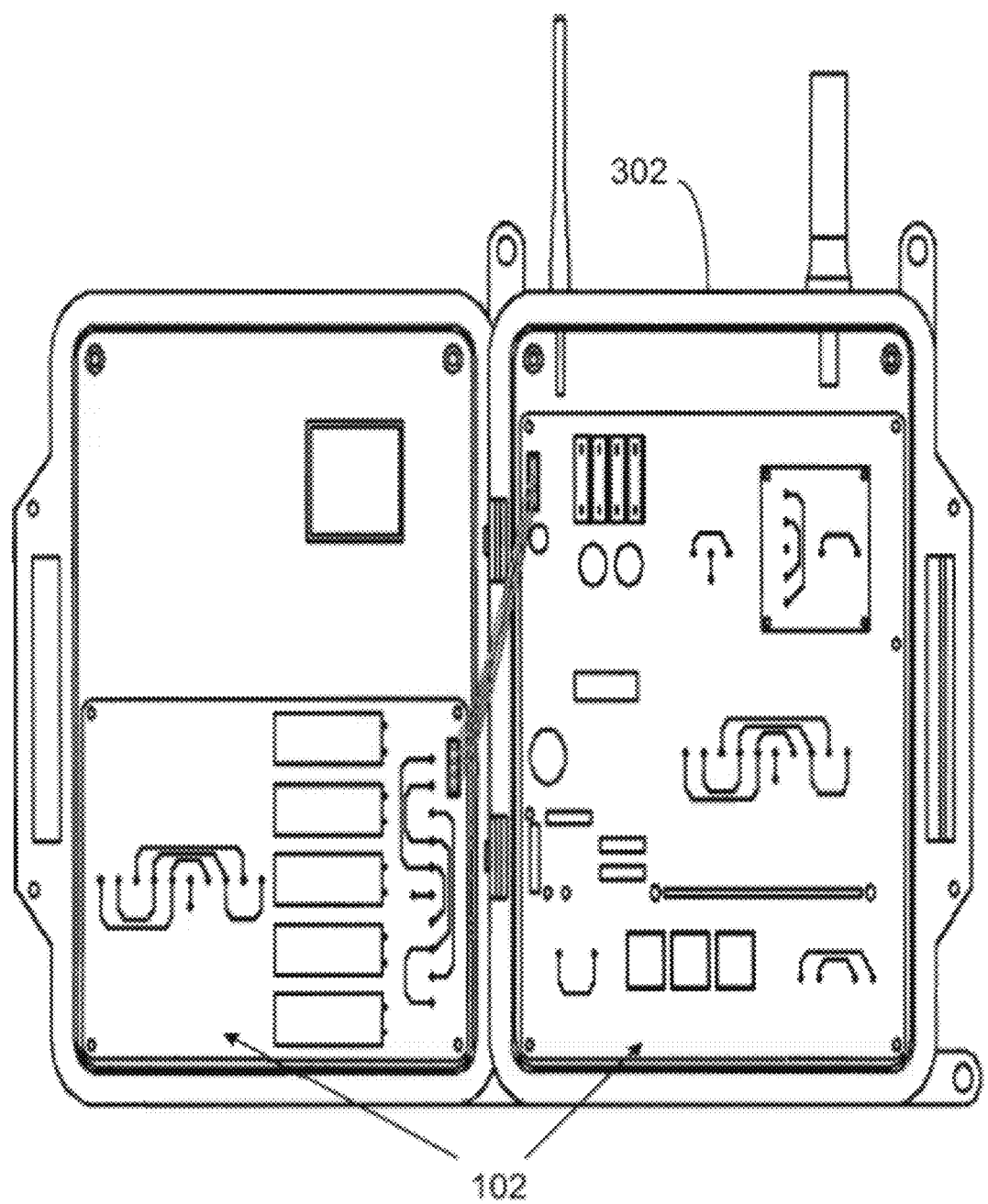

FIG. 3B depicts various circuit boards of the intelligent communications device 102 embedded in the enclosure 302 for safety. The enclosure may include circuitry 306, 308 to raise an alarm if the enclosure is tampered with by an unauthorized entity. Additionally, a provision may be provided in the apparatus that may intelligently determine if the enclosure is opened for repair through an authorized entity.

Management Tools

The intelligent communications device 102 may be interfaced with standard off-the-shelf network management tools. In an embodiment of the present invention, the management tools may be integrated in one or more utilities. Alternatively, the management tools may be implemented on computing devices such as personal computers, servers, and/or electrical control panels.

The intelligent communications device 102 may work in harmony with other smart devices in order to create a seamless infrastructure and to enhance the capability of the smart grid infrastructure. Thus, the intelligent communications device 102 may allow reclosers from one vendor to be integrated with the electronic meters from another vendor for building a collaborative smart grid infrastructure.

The intelligent communications device 102 may implement open source and may facilitate two-way delivery of real-time energy usage data over public wireless network. Further, the open source may simplify deployment of the smart devices in a smart grid infrastructure.

Security Features

In an embodiment of the present invention, the intelligent communications device 102 may secure communication between the intelligent communications device 102 and the external smart devices. For this purpose, the intelligent communications device 102 may implement various security algorithms as known in the art, including IP security and cryptography for secure transfer of data. Internet Protocol Security (IPsec) is a protocol suite for securing Internet Protocol (IP) communications by authenticating and encrypting each IP packet of a data stream. In another embodiment, the intelligent communications device 102 may implement RSA algorithm for securing data transfer.

In embodiments, the intelligent communications device 102 may facilitate collaboration between various interconnected equipment in the smart grid infrastructure. For example, the intelligent communications device 102 may facilitate collaboration between groups of consumers. In another example, the intelligent communications device 102 may facilitate collaboration between different electrical appliances belonging to a particular consumer. In yet another example, the intelligent communications device 102 may facilitate optimization and collaboration of electricity usage related to a particular electrical appliance, for example, a consumer washing machine.

The transmission aspect may be focused on surveillance, fault management, and/or voltage regulation, among others. The intelligent communications device 102 includes software and/or applications for monitoring and surveillance, fault management, and/or voltage regulation. Reports of unusual activity detected by the intelligent communications device 102 may be forwarded to a control station or to security staff via alert. The recorded data may be recorded in a log file, which may be forwarded to the concerned authority in real-time for remedial action. Alternatively, the intelligent communications device 102 may, based on its own capability, resolve the issue without raising an alert.

The distribution aspect may include among other aspects monitoring and management of switches, meters, and/or reclosers. The intelligent communications device 102 may allow integration of various devices into seamless smart grid configuration. For example, a meter from one vendor may be configured with the recloser from another vendor. By implementing open standards in the intelligent communications device 102, the distribution companies can focus on building the smart grid infrastructure without worrying about the product working on a dedicated technology, since the intelligent communications device 102 may act as a universal hub for integrating various technologies.

A consumer may utilize the intelligent communications device 102 for conserving electrical consumption. In this aspect, consumer devices may be directly connected with the intelligent communications device 102. Exemplary consumer devices may include transformers, fault management devices, power meters, water meters, gas meters, load limiters, and disconnect switches. The intelligent communications device 102 may manage these smart devices in an optimum manner for saving electricity.

Solar Power

In an embodiment of the present invention, the intelligent communications device 102 may be solar powered. The outer enclosure of the intelligent communications device 102 maybe fitted with photovoltaic cells that may receive solar energy. The solar energy may be utilized to charge one or more batteries; the charged batteries may allow communication with utility management infrastructure even during a power failure. Thus, the apparatus may work continuously without interruption.

Solar power may be further utilized to provide power for critical activities during a power failure, such as clock, wireless facility, memory and other communication circuitry.

Computer-Executable Software Embodiments

In an embodiment of the present invention, the intelligent communications device 102 may include software and hardware for implementing virtualization. For example, the intelligent communications device 102 may implement hardware virtualization. Implementing virtualization may facilitate the process of disaster recovery, induce higher levels of abstraction, and increased level of security.

In yet another embodiment of the present invention, the intelligent communications device 102 may include software for implementing distributed computing architecture. For example, various software processes may communicate with databases/repositories of the central control station to periodically update the repositories and/or databases. Such an arrangement may reduce the probability of loss of data during disaster and/or failure of other equipment.

In yet another embodiment of the present invention, the software-implemented multiple processes enable processing of data in real time. In this aspect, the software executed by the associated processor may spawn multiple threads for faster execution and real-time monitoring of the utilities. Such implementation may facilitate quick response to adverse events, thereby reducing the probability of failure of the overall infrastructure.

Figure 3C:
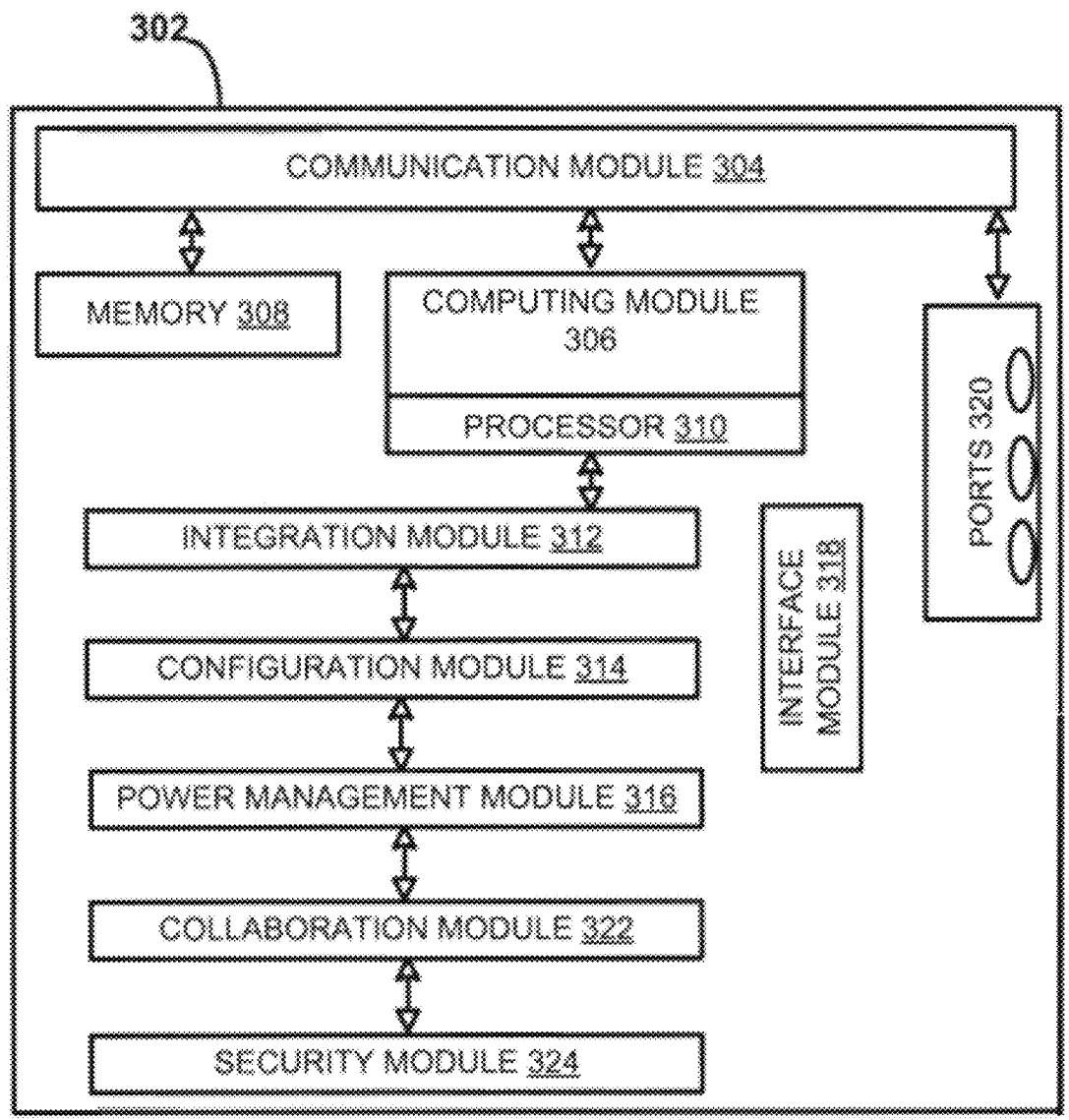

Referring to FIG. 3C, the intelligent communications device 102 may include an enclosure 302, a communication module 304, a memory 308, and a computing module 306 having a processor 310. The communication module 304 may be coupled with the memory 308 and to the computing module 306. In addition, the computing module 306 may be associated with the integration module 312 as well as interface module 318. The smart devices and/or facilities may be attached at one or more ports 320. The data received at one or more ports 320 may be forwarded to an integration module 312, a configuration module 314, a power management module 316, and the collaboration module 322. Additionally, smart devices may be incorporated into the smart grid infrastructure using a collaboration module 322.

In an embodiment of the present invention, addition of a device at one of the ports 320 may initiate integration of the device into the smart grid infrastructure. The signal received from the device may be forwarded to the interface module 318 to determine the type of device, attributes, and other details for integration with the intelligent communications device 102. Once the parameters of the devices have been ascertained, the integration module 312 and the configuration module 314 may facilitate integration for incorporating the device into the smart grid infrastructure. For example, the configuration module 314 may search for device drivers, applications and other software that may enable smooth adaptation of the device into the smart grid infrastructure.

In an embodiment of the present invention, a security module 324 may secure communication between the external smart devices and/or various facilities. For example, the security module may use encryption techniques known in the art for protecting data. Likewise, different security protocols may be implemented by the security module 324 for protecting data.

Figure 4:
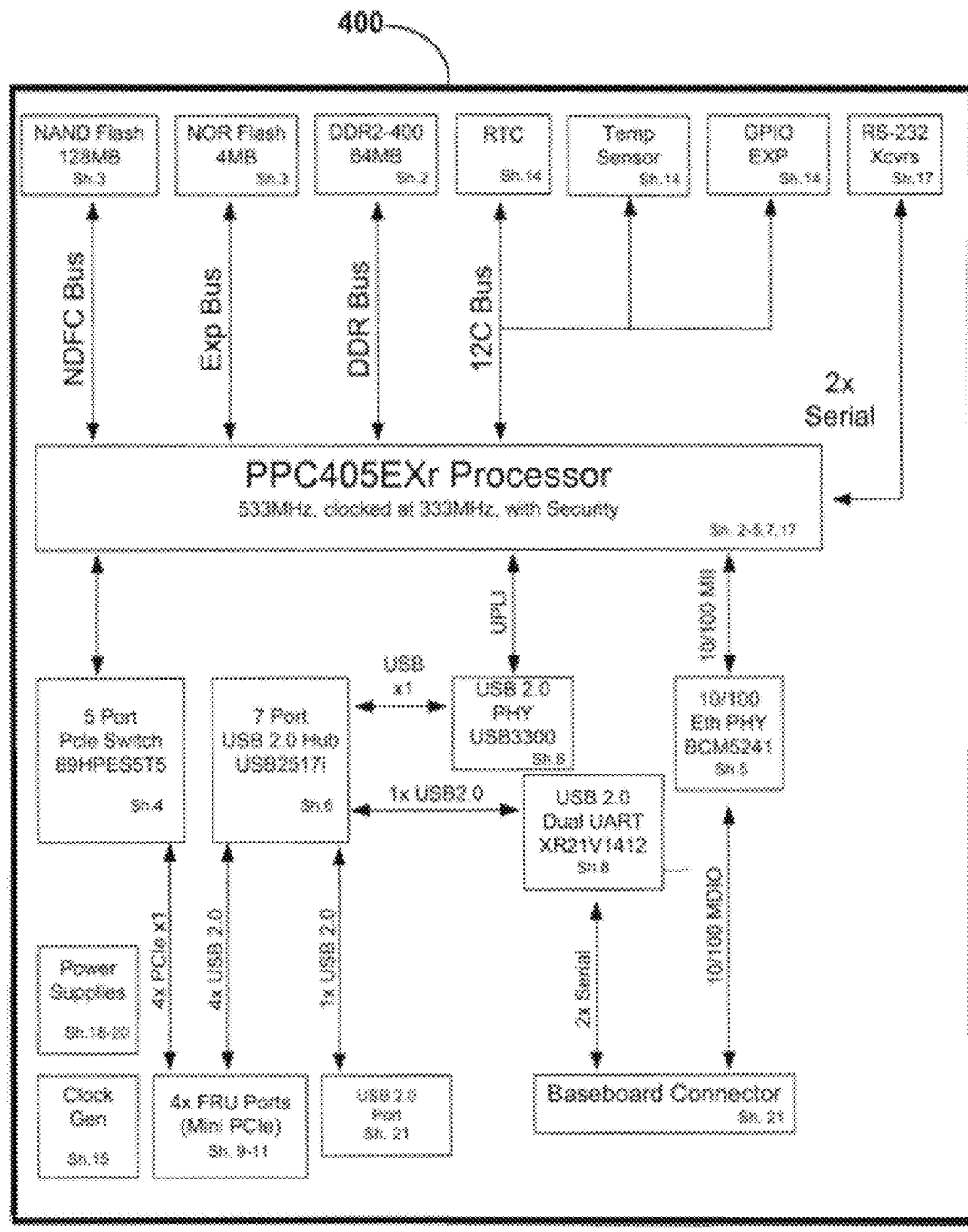
FIG. 4 schematically shows operative circuitry for an intelligent communications device according to one or more embodiments of the present invention.

Referring to FIG. 4, an exemplary outlay 400 of an intelligent communications device 102 is shown, according to one embodiment of the present invention. The internal configuration of the apparatus 400 may include a NAND flash, a NOR flash, a RAM, Temperature sensor, a, RTC, a GPIO, and an interface circuitry such as RS232 coupled to the processor, such as PPC405 EXr Processor. Additionally, a plurality of ports may be interfaced with the processor, such as USB ports, Ethernet ports, switch input connectors, and/or hubs. The circuitry may receive AC/DC power from the power supply, and the power supply may deliver different voltages such as +5V, −5V, +12V, −12V, +15V, −15V and other voltages. Various connectors may be utilized for connecting different type of active and passive components. A clock generation circuitry may be provided for servicing circuits requiring clock pulses.

In an embodiment of the present invention, integrated circuits may be utilized for assembling the embodiment shown in FIG. 4 in association with other active and passive electronic components. Additionally, the circuitry may be laid on a multiple tier PCB for laying the passive and active electronic components and circuits.

Interface Bus for Utility-Grade Telemetry

Figure 5:
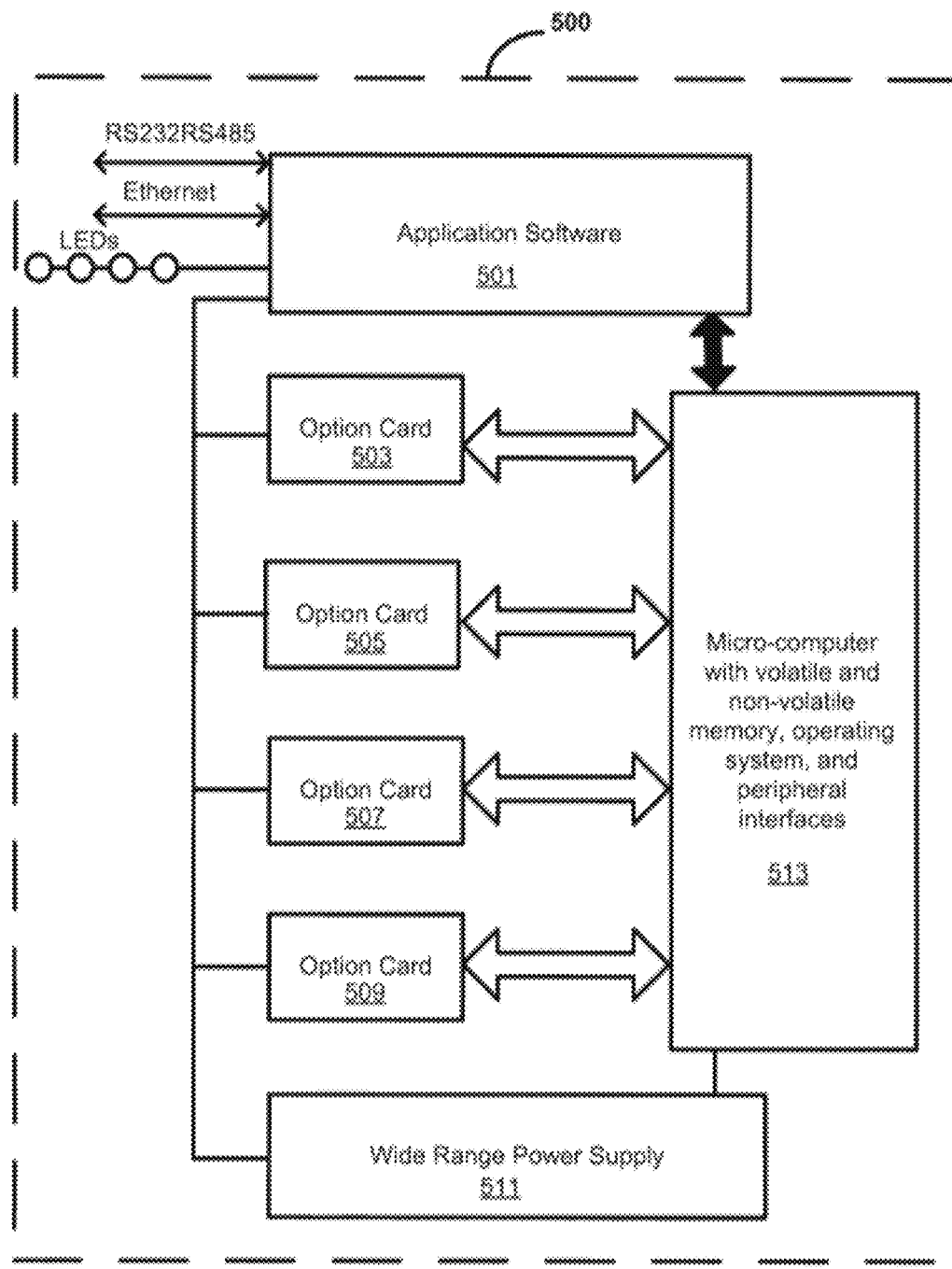
FIG. 5 schematically shows a main circuit board according to one embodiment of the present invention.

FIG. 5 schematically shows a standard interface configuration on a main circuit board 500, according to one embodiment of the present invention. In one embodiment, the main circuit board 500 is mounted in a protective enclosure, such as a utility-grade enclosure as shown in FIG. 3. A micro-computer 513 complete with programmable processor, volatile and non volatile memory, operating system and peripheral interfaces is configured on the main circuit board 500. Secondary circuit boards 503, 505, 507 and 509 (also referred to as "field replaceable units" or "FRU"s) are operatively connected with the peripheral interfaces. The secondary circuit boards may be in the form of cards configured to mate with corresponding connection slots coupled to the main circuit board 500. These standard hardware interfaces can be selected from variety of secondary circuit board connectors available, such as PCIe mini express slots. The standard interfaces support third party hardware and implement open standards for various form factors. The standard interfaces are compatible with different secondary circuit boards. The applications and/or programs can be updated in real-time, and updates corresponding to programs and/or applications may be executed at predefined times.

In the embodiment shown in FIG. 5, a wide range power supply 511 is provided on the main circuit board. Independent voltage and power regulators are also provided on the main circuit board, to regulate the voltage and power supplied to the secondary circuit boards 503, 505, 507, 509 using hardware interfaces. A programmable processor (not shown) regulates operations of the devices and secondary circuit boards, in response to changes in predetermined parameters associated with standard individual hardware. The programmable processor manipulates the individual voltage and power regulator for turning OFF or ON of a particular secondary circuit board slot.

According to one or more exemplary embodiments of the present invention, the interfaces are hardened for utility-type use, meaning that the apparatus complies with ANSI standards for particular equipment connected to a utility facility. For example, ANSI C12 37.90 corresponds to a standard for a surge-withstand test, and C12.1 designates a metering environmental standard. It can withstand extreme temperature conditions. Hardening provides for independent control of voltage regulators, sensors and heaters. There are independent interfaces for power regulators, separate temperature monitors, sensors, and independent heaters.

In one embodiment, application software 501 is provided, which is configured to be executable by the programmable processor. The programmable processor is operative to execute the software to monitor operability of the secondary circuit boards 503, 505, 507, 509 that are configured using standard interfaces on the main circuit board 500. The programmable processor operatively monitors and regulates the secondary circuit boards 503, 505, 507, 509 using standard interfaces according to the predetermined parameters. The secondary circuit boards 503, 505, 507, 509 are operative to perform various functions including communication with remotely located intelligent communications devices and providing remote hardware monitoring service.

In one embodiment, a management information database (MIB) is provided for actively maintaining a log of data associated with internal events. SNMP tools can access the MIB and query regarding status of internal components, and predetermined parameters are available at the MIB. The predetermined parameters are modifiable via updating commands to the accessible MIB.

The programmable processor is further operative to actively maintain a table of data associated with a real-time operative state of the secondary circuit boards 503, 505, 507, and 509. In an embodiment, the programmable processor is further operative to perform real-time monitoring of the operability of the plurality of expansion cards using an appropriate interface.

Figure 6:
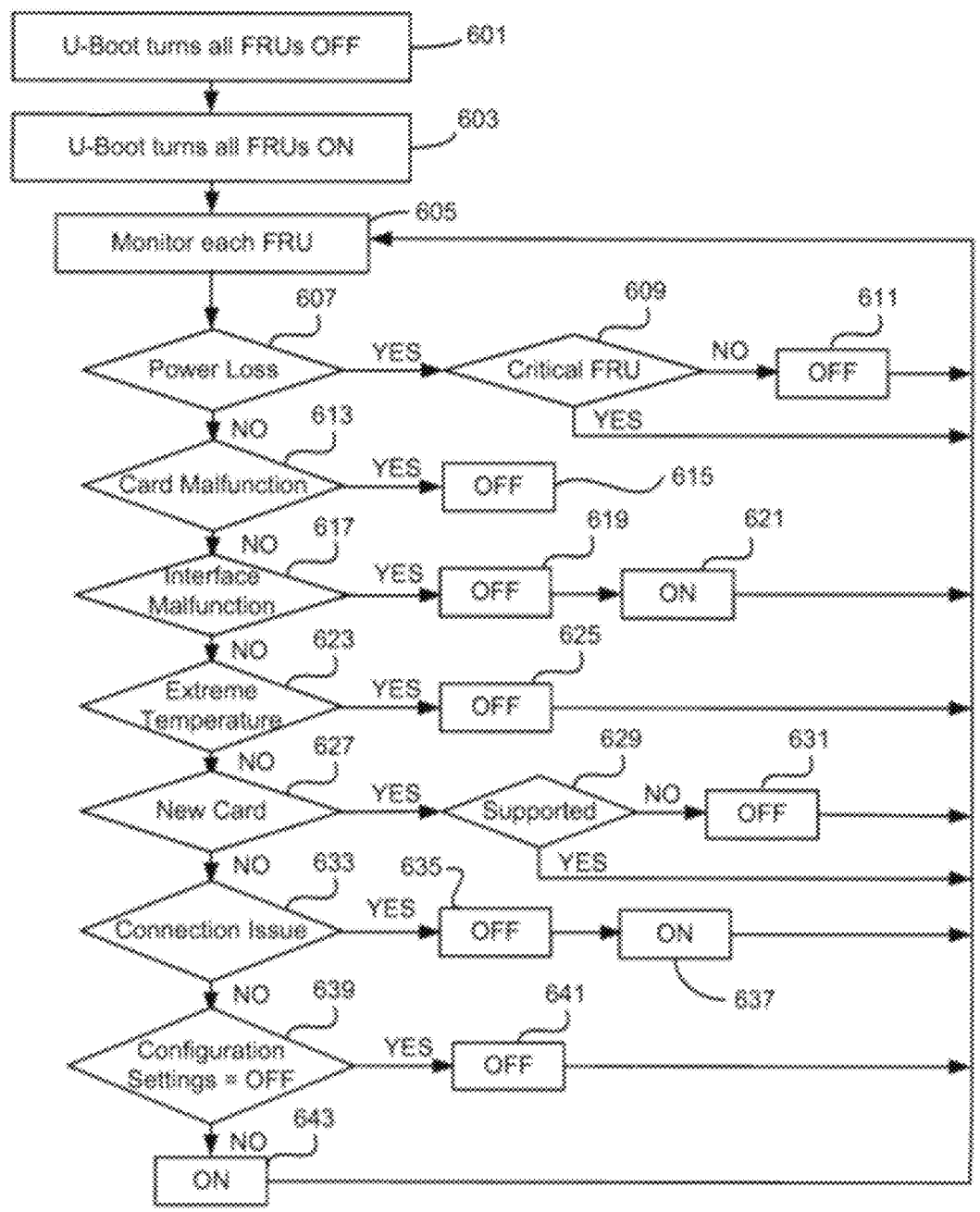
FIG. 6 shows a flow chart of the operational steps of a routine for monitoring and regulating hardware interfaces, according to one embodiment of the present invention.

FIG. 6 illustrates a flow chart of operational steps of a routine 600 for monitoring and regulating operability of the secondary circuit boards configured on the hardware interfaces, according to one embodiment of the present invention. In one or more embodiments, the routine 600 may be executed by the programmable processor, for example according to computer-executable instructions on a computer-readable medium which, when executed by the processor, causes a computer to perform the operational steps.

Referring now to FIG. 6, the routine 600 starts at step 601, where a U-Boot command turns all FRUs off. Next, operation proceeds along the path from step 601 to step 603. At step 603, a U-Boot command turns all FRUs on, and the operation proceeds to step 605. Those skilled in the art will recognize that U-Boot is a freely available universal boot loader.

At step 605, predetermined parameters are monitored for each FRU. Monitoring of operability of the secondary circuit boards is a routine for the programmable processor to determine that the secondary circuit boards are operating according to predetermined parameters. The routine is repeatable following a particular series of conditions and determinations.

From step 605, the operation moves along to step 607, where it is determined if there is a power loss to any or all of the circuit boards operatively connected inside the router enclosure (see FIG. 3). If it is determined at step 607 that there is a power loss at any of the interfaces, then the operation proceeds along the "Yes" path to step 609. If at step 607 it is determined that there is no power loss at any of the interfaces, then the operation proceeds along the "No" path to step 613. At step 609, a determination is made whether the secondary circuit board configured on the interface is a critical FRU. If it is determined at step 609 that the secondary circuit board configured on the interface is a critical FRU, then the operation proceeds along the "Yes" path to step 605, and the operation cycles back to repeat the routine. If it is determined at step 609 that the secondary circuit board configured on the interface is not a critical FRU, then the operation proceeds along the "No" path to step 611, where the FRU is turned off, and then the operation cycles back to step 605. At step 605, the operation proceeds to restart the routine.

At step 613, the programmable processor determines if there is a card malfunction at the interface. If it is determined at step 613 that there is a card malfunction, the operation proceeds along the "Yes" path to step 615 where the secondary circuit board is turned off. If it is determined at step 613 that there is no card malfunction, then the operation proceeds along the "No" path to step 617.

At step 617, it is determined if an interface malfunction exists at the hardware interface. If it is determined that an interface malfunction exists, then the operation proceeds along the "Yes" path to step 619, where the secondary circuit board is turned off. The operation proceeds next to step 621, where the secondary circuit board is again turned on, and the operation then cycles back to step 605. At step 605, the operation proceeds to restart the routine. If it is determined at step 617 that no interface malfunction issue exists, then the operation proceeds along the "No" path to step 623.

At step 623 it is determined if there are extreme temperature conditions at any slot of the secondary circuit boards, or generally within the enclosure. If it is determined that there exists an extreme temperature condition at the secondary circuit board, the operation proceeds along the "Yes" path to step 625, where the particular secondary circuit board is turned off and the operation cycles back to step 605. If it is determined at step 623 that extreme temperature conditions do not exist at any slot location or inside the enclosure, then the operation proceeds along the "No" path to step 627.

At step 627 it is determined if a particular secondary circuit board is a newly connected circuit board. If it is determined that there is a new secondary circuit board on the interface, then operation proceeds along the "Yes" path to step 629, where the processor determines if the new secondary circuit board is supported. If it is determined that the new secondary circuit board is supported, then operation proceeds along the "Yes" path to step 605, to cycle the routine again. At step 629, if it is determined that the new card is not supported, then the operation proceeds along the "No" path to step 631, where the secondary circuit board is turned off and the routine cycles again. At step 627, if it is determined that the card configured on the interface is not a new card, the operation proceeds along the "No" path to step 633.

At step 633 it is determined if connection issues exist on the hardware interface. If it is determined that a connection issue exists, then operation proceeds along the "Yes" path to step 635, where the secondary circuit boards are turned off. The operation proceeds next to step 637. At step 637, the secondary circuit boards are turned on and the operation cycles back to step 605. If it is determined at step 633 that connection issues do not exist at any card location, then operation proceeds along the "No" path to step 639.

At step 639 it is determined if configuration settings are off for the interface. If it is determined that the configuration settings are off for the interface, then operation proceeds along the "Yes" path to step 641, where the secondary circuit board is turned off, and then operation cycles back to step 605. If it is determined at step 633 that configuration settings are not off, then operation proceeds along the "No" path to step 643, where secondary circuit boards that are on are kept on, and the routine is cycled again.

The programmable processor controls and monitors operability of the interfaces in response to different predetermined parameters. The predetermined parameters are may include one or more of temperature, voltage, state of input power, operational state of the device, mode of the operation of the device, door open status, network status, and system health.

The programmable processor monitors the ability of a device to respond to commands, and the ability of the device to perform its designated function. For example, in case of a cellular modem, the processor will monitor the ability of modem to respond to commands and ability of the modem to attach to a network.

In an embodiment, there is at least one temperature sensor disposed in proximity for each standard slot interface. The temperature is monitored for the internal environment of the intelligent communications device 102. The temperature is also monitored at a particular location in proximity to each FRU. On secondary circuit board slots there are onboard sensors to monitor temperature of that particular circuit board. For example, dot sensors are mounted on the secondary circuit board. Hardware interfaces are selectively enabled or disabled in response to extreme temperature conditions.

The programmable processor can selectively enable or disable hardware interfaces according to the network status. In an exemplary embodiment there are multiple radios in a given device and the device is connected with a primary network. At some point of time if the primary network is not viable and it is required to connect to a secondary network, then the interface for a radio for the primary network is turned off and another slot is turned on to connect to secondary network. In case more than one network is detected, the programmable processor will select an appropriate network based on feature, signal strength and commercial considerations, for the modem to attach to the network, by sending an appropriate command using a standard hardware interface bus.

The programmable processor can selectively enable or disable hardware interfaces according to status of the door of the enclosure. Certain hardware interfaces are turned on or off in response to the door open or close status.

The programmable processor can selectively enable or disable hardware interfaces according to desired operating modes. For example, hardware interfaces are turned on or off based upon which out of LAN/WAN/HAN is to be chosen.

The programmable processor can selectively enable or disable hardware interfaces according to a power outage condition. Certain hardware interfaces are disabled in a power outage condition.

The methods described herein may be deployed in part or in whole through one or more devices that are capable of executing computer software, program codes, and/or instructions on corresponding processors. A processor may be part of a server, client, network infrastructure, mobile computing platform, stationary computing platform, or other computing platform. The processor may be any kind of computational or processing device capable of executing program instructions, codes, and/or binary instructions. The processor may be or may include a signal processor, a digital processor, an embedded processor, a microprocessor or any variant such as a co-processor (e.g. a math co-processor, a graphic co-processor, and/or a communication co-processor), that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program and instructions are described herein may be implemented in one or more threads. A thread may spawn other threads that may have assigned priorities associated with them; the processor may execute these threads based on a priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other types of instructions capable of being executed by the computing or processing device may include, but may not be limited to, one or more of a CD-ROM, DVD, memory, hard disk, flash drive, RAM, ROM, and/or cache.

The processor may include one or more cores that may enhance speed and performance of a multiprocessor. In embodiments, the process may be a dual core processor, quad core processors, or other chip-level multiprocessors that combine two or more processors.

The methods and systems described herein may transform physical and/or or intangible items from one state to another. The methods and systems described herein may also transform data representing physical and/or intangible items from one state to another.

The elements described and depicted herein, including the elements described in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, and/or routers. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application-specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs steps thereof. In another aspect, the methods may be embodied in systems that perform steps thereof, and may be distributed across devices in a number of ways, or all of the functionality may be integrated into a dedicated, standalone device or other hardware. In another aspect, the means for performing steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples.

What is claimed is:

1. A network device having a plurality of interfaces, comprising:
   a central processing unit (CPU);
   a main circuit board having a plurality of expansion slots operatively connected thereto, the plurality of expansion slots operative to receivably connect a corresponding plurality of secondary circuit boards to the main circuit board, the main circuit board further having at least one voltage regulator and at least one sensor for detecting one or more predetermined parameters;
   a first secondary circuit board operatively connected to the main circuit board via a first expansion slot, the first secondary circuit board to support communication over a smart grid network via a first wireless communication protocol; and
   a second secondary circuit board operatively connected to the main circuit board via a second expansion slot, the second secondary circuit board to support communication over the smart grid network via a second wireless communication protocol,
   wherein the CPU is operative, via the voltage regulator, to regulate at least one expansion slot of the plurality of expansion slots in response to at least one predetermined parameter associated with the particular expansion slot.

2. The device of claim 1, wherein the device further comprises a management information base (MIB) operative to store and actively maintain a log comprising data associated with internal events.

3. The device of claim 1, wherein the predetermined parameters are stored at an accessible management information base (MIB).

4. The device of claim 1, wherein the predetermined parameters are modifiable via updating commands to an accessible management information base (MIB).

5. The device of claim 1, wherein the CPU is further operative to actively maintain a table of data comprising data associated with a real-time operative state of the plurality of secondary circuit boards.

6. The device of claim 1, wherein the CPU is further operative to execute a software that, when executed monitors operability of all circuitry on the main circuit board and operatively regulates at least one of the plurality of expansion slots according to the at least one predetermined parameter.

7. The device of claim 1, wherein the at least one predetermined parameter comprises at least one parameter associated with temperature, voltage, state of input power, operational state of the device, mode of operation of the device, door open, network status, and system health.

8. The device of claim 1, wherein the smart grid network is operable to monitor and manage electrical energy consumption.

9. The device of claim 1, wherein the predetermined parameter is a network status defining an availability of communication over the smart grid network via the first and second communication protocols, respectively.

10. The device of claim 9, wherein the CPU is operative, via the voltage regulator, to enable the first expansion slot and disable the second expansion slot if the network status indicates that communication over the smart grid network via the first communication protocol is available.

11. The device of claim 9, wherein the CPU is operative, via the voltage regulator, to disable the first expansion slot and enable the second expansion slot if the network status indicates that communication over the smart grid network via the first communication protocol is unavailable.

12. A remotely operable system, comprising:
    a central processing unit (CPU);
    a main circuit board having a plurality of interfaces, the interfaces comprising one or more sensors operative to sense one or more predetermined parameters;
    a first secondary circuit board operatively connected to the main circuit board via a first interface, the first secondary circuit board to support communication over a smart grid network via a first wireless communication protocol; and
    a second secondary circuit board operatively connected to the main circuit board via a second interface, the second secondary circuit board to support communication over the smart grid network via a second wireless communication protocol,
    wherein the CPU operatively regulates the interfaces according to sensed predetermined parameters.

13. The system of claim 12, wherein the system further comprises a management information base (MIB) operative to actively maintain a log comprising data associated with internal events.

14. The system of claim 12, wherein the predetermined parameters are stored at an accessible management information base (MIB).

15. The system of claim 12, wherein the predetermined parameters are modifiable via updating commands to an accessible management information base (MIB).

16. The system of claim 12, wherein the CPU is further operative to actively maintain a table of data comprising data associated with a real-time operative state of the plurality of interfaces.

17. The system of claim 12, wherein the CPU is further operative to execute a software operative to monitor operability of all circuitry on the main circuit board and operatively regulate the plurality of interfaces according to the one or more predetermined parameters.

18. The system of claim 12, wherein at least one of the predetermined parameters is associated with temperature, voltage, state of input power, operational state of the system, mode of operation of the system, door open, network status, and system health.

19. A computer-implemented method for remotely operating a network device, the method comprising:
configuring first and second interfaces on a main circuit board, the the first interface operative to receivably connect a first secondary circuit board to support communication on a smart grid network via a first communication protocol, and the second interface operative to receivably connect a second secondary circuit board to support communication on the smart grid network via a second communication protocol, the main circuit board further comprising a voltage regulator and a sensor; and
selectively enabling or disabling, via the voltage regulator, the first and second interfaces, based on a predetermined parameter measured by the sensor.

20. The method of claim 19, wherein the device further comprises a management information base (MIB) operative to maintain a log comprising data associated with internal events.

21. The method of claim 19, wherein the one or more predetermined parameters are available at an accessible management information base (MIB).

22. The method of claim 19, wherein the predetermined parameters are modifiable via updating commands to an accessible management information base (MIB).

23. The method of claim 19, further comprising a CPU operative to execute a software operative to monitor operability of all circuitry on the main circuit board and to operatively regulate the first and second interfaces, respectively, according to predetermined parameters.

24. The method of claim 23, wherein the CPU is further operative to perform real time monitoring of operability of the first and second interfaces, respectively.

25. The method of claim 19, further comprising a CPU operative to actively maintain a table of data comprising data associated with a real time operative state of the first and second interfaces, respectively.

26. The method of claim 19, wherein the one or more predetermined parameters comprise parameters associated with at least one of temperature, voltage, state of input power, operational state of the device, mode of operation of the device, door open, network status and system health.

27. The method of claim 19, wherein the smart grid network is operable to monitor and manage electrical energy consumption.

28. The method of claim 27, further comprising determining a network status defining an availability of communication over the smart grid network via the first and second communication protocols, respectively.

29. The method of claim 28, wherein the first interface is enabled and the second interface is disabled if the network status indicates that communication over the smart grid network via the first communication protocol is available.

30. The method of claim 28, wherein the first interface is disabled and the second interface is enabled if the network status indicates that communication over the smart grid network via the first communication protocol is unavailable.

* * * * *

UNITED STATES PATENT AND TRADEMARK OFFICE
CERTIFICATE OF CORRECTION

PATENT NO. : 8,880,765 B2
APPLICATION NO. : 12/899498
DATED : November 4, 2014
INVENTOR(S) : Charles W. Melvin et al.

Page 1 of 1

It is certified that error appears in the above-identified patent and that said Letters Patent is hereby corrected as shown below:

In the Claims

In Column 19, line 7: Delete "the", second occurrence, between --the-- and --first--

Signed and Sealed this
Tenth Day of February, 2015

Michelle K. Lee
*Deputy Director of the United States Patent and Trademark Office*